United States Patent [19]
Ducote

[11] Patent Number: 5,501,288
[45] Date of Patent: *Mar. 26, 1996

[54] REMOTE STEERING OF ON-HIGHWAY MOTOR VEHICLES

[76] Inventor: Edgar A, Ducote, P.O. Box 45654, Baton Rouge, La. 70895

[*] Notice: The term of this patent shall not extend beyond the expiration date of Pat. No. 5,139,103.

[21] Appl. No.: 371,383

[22] Filed: Jan. 11, 1995

Related U.S. Application Data

[63] Continuation-in-part of Ser. No. 130,470, Oct. 1, 1993, Pat. No. 5,392,872, which is a continuation-in-part of Ser. No. 807,199, Dec. 16, 1991, Pat. No. 5,305,844, which is a division of Ser. No. 594,716, Oct. 9, 1990, Pat. No. 5,135,064, which is a continuation-in-part of Ser. No. 337,192, Apr. 13, 1989, Pat. No. 5,026,085.

[51] Int. Cl.$^6$ .................................................. B62D 61/10
[52] U.S. Cl. ........................................ 180/24.01; 180/79.1
[58] Field of Search ...................... 180/23, 24, 24.01, 180/140, 155, 79.1; 280/91, 98, 99, 103

[56] References Cited

U.S. PATENT DOCUMENTS

| 1,402,175 | 1/1922 | Overman | 180/24.01 |
|---|---|---|---|
| 1,454,162 | 5/1923 | Furlong | 180/24.01 |
| 1,856,787 | 1/1929 | Schellentrage et al. | 180/24.01 |
| 1,871,432 | 8/1932 | Fageol | 280/91 |
| 2,698,668 | 1/1955 | McKay | 180/22 |
| 3,323,610 | 6/1967 | Kress et al. | 180/24.01 X |
| 3,486,576 | 1/1968 | Breon et al. | 180/79.2 |
| 4,941,671 | 7/1990 | Ellingsen | 280/91 |
| 5,013,057 | 5/1991 | Vännimmaja et al. | 280/426 |
| 5,088,570 | 2/1992 | Loeber | 180/24.01 |
| 5,139,103 | 8/1992 | Ducote | 180/24.01 |
| 5,232,238 | 8/1993 | Ducote | 280/426 |

FOREIGN PATENT DOCUMENTS

| 699566 | 2/1931 | France | 180/24.01 |
|---|---|---|---|
| 762327 | 4/1934 | France | 180/24.01 |
| 362687 | 9/1938 | Italy | 180/24.01 |
| 23017 | 1/1904 | United Kingdom | 180/24.01 |
| 148255 | 10/1921 | United Kingdom | . |
| 435326 | 9/1935 | United Kingdom | 180/24.01 |
| 525824 | 9/1940 | United Kingdom | . |

Primary Examiner—Kevin T. Hurley
Attorney, Agent, or Firm—Reginald F. Roberts, Jr.

[57] ABSTRACT

An extended motor vehicle having steerable wheels at the front and rear ends of the vehicle, and fixed wheels near the middle of the vehicle. The steerable wheels at the rear of the vehicle are forcibly and remotely steered in accordance with the orientation of the steering wheel and the geometry of the motor vehicle. The position of the steering wheel is sensed electrically and transmitted to the steerable rear wheels.

8 Claims, 3 Drawing Sheets

REMOTE STEERING OF ON-HIGHWAY MOTOR VEHICLES

This application is a continuation in part of application Ser. No. 130,470, filed Oct. 1, 1993 now U.S. Pat. No. 5,392,872, which is a continuation in part of application Ser. No. 807,199 now U.S. Pat. No. 5,305,844, filed Dec. 16, 1991, which is a division of application Ser. No. 594,716, filed Oct. 9, 1990, U.S. Pat. No. 5,135,064, which is a continuation in part of application Ser. No. 337,192, filed Apr. 13, 1989, U.S. Pat. No. 5,026,085.

BACKGROUND OF THE INVENTION

The present invention relates to mobile vehicles. More particularly, the invention relates to on-highway motor vehicles designed to operate at highway speeds.

Special terms used herein are defined as follows:

Forward: Toward the front end of the vehicle.

Aft: Toward the rear end of the vehicle.

Highway speeds: Speeds in excess of fifty miles per hour.

Extended motor vehicle: A motor vehicle having an elongated, integral chassis.

Elongated: Substantially longer than a conventional automobile; having a length of from about fifteen to about forty feet.

Integral: Unitary; not segmented; not formed e.g. like a tractor-trailer.

Axle: A shaft which connects wheels located on opposite sides of a frame which is supported by the shaft.

Short axle: A shaft which connects a pair of wheels on the same side of the frame.

Spindle: A short conical shaft on which a wheel is mounted.

Driving axle: An axle that is power-driven.

Fixed axle: An axle permanently aligned in a particular configuration with respect to the frame.

Steerable axle: An axle which is capable of changing orientation with respect to the frame.

Tandem axles: A pair of axles very near one another; not spaced apart or separated by a distance of more than about two or three feet.

Spread axles or spread-tandem axles: Axles spaced apart and separated by a distance of about ten feet.

Fixed wheel: A wheel the orientation of which remains unchanged with respect to an axle on which the wheel is mounted.

Steerable wheel: A wheel which is capable of changing direction with respect to and independently of a fixed axle to which the wheel is connected by a spindle.

Much of the background information relating to the present invention may be found in U.S. Pat. No. 5,139,103 to Ducote, and in application Ser. No. 130,470, filed Oct. 1, 1993, both of which are hereby incorporated by reference.

Mobile vehicles encompassed by the present invention and present application include recreation-vehicle (RV) motor homes, trucks, busses, moving vans, and passenger vans.

Axles with forcibly-steered wheels are disposed at the front ends of automotive vehicles. The wheels are manually steered by a driver by means of a steering wheel. The axles are designed to have a single wheel with a tire at each end of the axle. Rotary movement of the steering wheel causes the ends of the steerable spindles on which the wheels are mounted to move forward or rearward. The wheels mounted on the spindles change lateral alignment with the vehicle. This causes the vehicle to steer to the right or to the left.

SUMMARY OF THE INVENTION

In general, the present invention in one aspect provides an extended motor vehicle having front and rear ends. The vehicle comprises an elongated, integral chassis including a frame; a body including a motor, mounted on the frame; a first pair of steerable wheels rotatably mounted on spindles attached to opposite ends of a first fixed axle at the front end of the vehicle; a second pair of steerable wheels rotatably mounted on spindles attached to opposite ends of a second fixed axle at the rear end of the vehicle; a pair of fixed wheels rotatably mounted on opposite ends of a third fixed axle disposed between and spaced apart from the first and second axles, at least one of the second and third axles being a driving axle; a steering wheel for directing the motion of the motor vehicle; and means for forcibly steering the second pair of steerable wheels in accordance with the orientation of the steering wheel and the geometry of the motor vehicle. The geometry includes the disposition and spacing of the axles and of the dimensions of the motor vehicle. The means for forcibly steering the second pair of steerable wheels include a steering column connected to the steering wheel; a steering shaft having first and second ends; a universal joint connecting the steering column to the first end of the steering shaft; a steering-gear box connected to the second end of the steering shaft; a pitman arm connected to and responsive to the gear box; an electrical sensor responsive to the position of the pitman arm and rigidly fastened to the frame of the vehicle; and a microprocessor electrically connected to the pitman arm. The microprocessor is programmed to receive from the sensor an electrical signal that is indicative of the position of the pitman arm, and to transmit an electrical signal indicative of the position of the pitman arm. The vehicle further comprises a servo-mechanism constructed and arranged to receive the electrical signal from the microprocessor, and to forcibly steer the second pair of steerable wheels in accordance with the signal.

In a second aspect the invention provides an improvement of an extended motor vehicle having front and rear ends; a steering wheel for directing the motion of the motor vehicle; a steering column connected to the steering wheel; an elongated, integral chassis including a frame; a body including a motor, mounted on the frame; and a first pair of steerable wheels attached to opposite ends of a first fixed axle at the front end of the vehicle. The improvement comprises a second pair of steerable wheels rotatably mounted on spindles attached to opposite ends of a second fixed axle at the rear end of the vehicle; a pair of fixed wheels rotatably mounted on opposite ends of a third fixed axle disposed between and spaced apart from the first and second axles, at least one of the second and third axles being a driving axle; and means for forcibly steering the second pair of steerable wheels in accordance with the orientation of the steering wheel and the geometry of the motor vehicle. The geometry includes the disposition and spacing of the axles and the dimensions of the motor vehicle. The means for forcibly steering the second pair of steerable wheels include a steering shaft having first and second ends; a universal joint connecting the steering column to the first end of the steering shaft; a steering-gear box connected to the second end of the steering shaft; a pitman arm connected to and responsive to the gear box; an electrical sensor responsive to the position of the pitman arm and rigidly fastened to the frame of the vehicle; and a microprocessor electrically connected to the pitman arm. The microprocessor is programmed to receive from the sensor an electrical signal that is indicative of the position of the pitman arm, and to transmit an electrical signal indicative of the position of the pitman arm. Said means further include a servomechanism constructed and arranged to receive the electrical signal from the microprocessor, and to forcibly steer the second pair of steerable wheels in accordance with said signal.

DETAILED DESCRIPTION OF THE INVENTION

Figure 1:
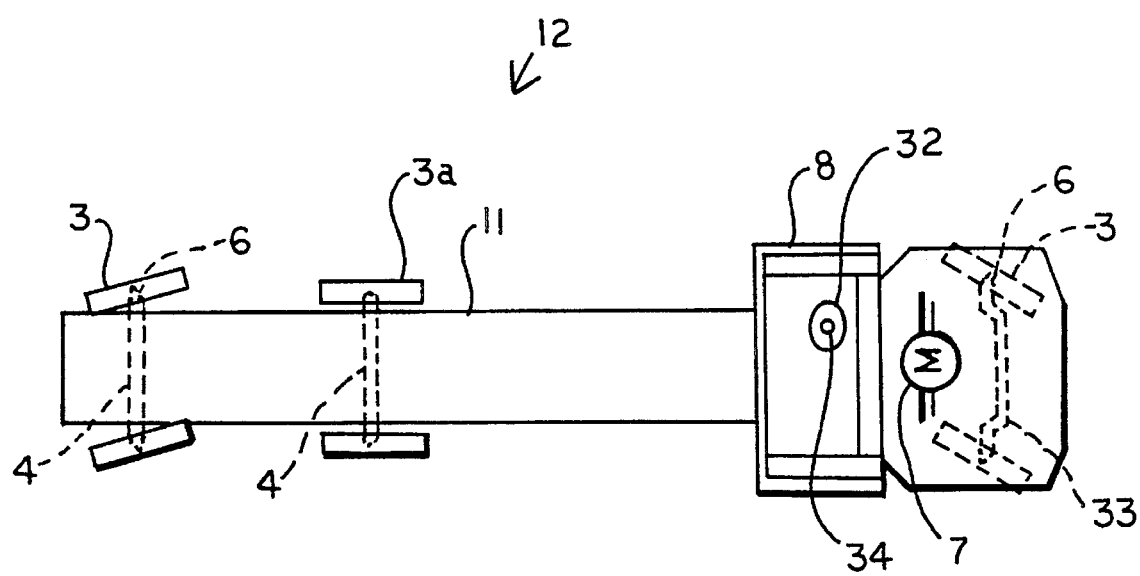
FIG. 1 is a schematic representation of an extended motor vehicle made in accordance with the principles of the present invention.

More specifically, reference is made to FIG. 1, in which is shown an extended motor vehicle made in accordance with the principles of the present invention, and generally designated by the numeral 12.

The motor vehicle 12 includes a frame 11. A body which includes a motor 7 and a cab 8 are mounted on the frame 11. Inside the cab 8 is a steering wheel 32 connected to a steering column 34. The body also includes a seat for the driver, a front windshield, two side windows, and a hood disposed above the motor 7, none of which is shown in the drawing.

The frame 11 is mounted on first, second, and third fixed axles 33, 4, and 4, respectively. The second and third axles 4 are straight beam, kingpin to kingpin. The first axle 33 is located near the front end of the vehicle 12, and is equipped with two steerable wheels 3 mounted on spindles 6 at opposite ends of the axle 33. The second axle 4 is located near the rear end of the vehicle 12, and is provided with two steerable wheels 3 mounted on spindles 6 attached to opposite ends of the axle 4. The third axle 4 is disposed between the first and second axles 33 and 4, respectively, and is equipped with two fixed wheels 3a mounted on opposite ends of the third axle 4. The third axle 4 acts as a pivot when turns are made.

In the most preferred embodiment of the present invention, the distance between the second and third axles 4, 4 is substantially less than the distance between the first axle 33 and the third axle 4.

Figure 2:
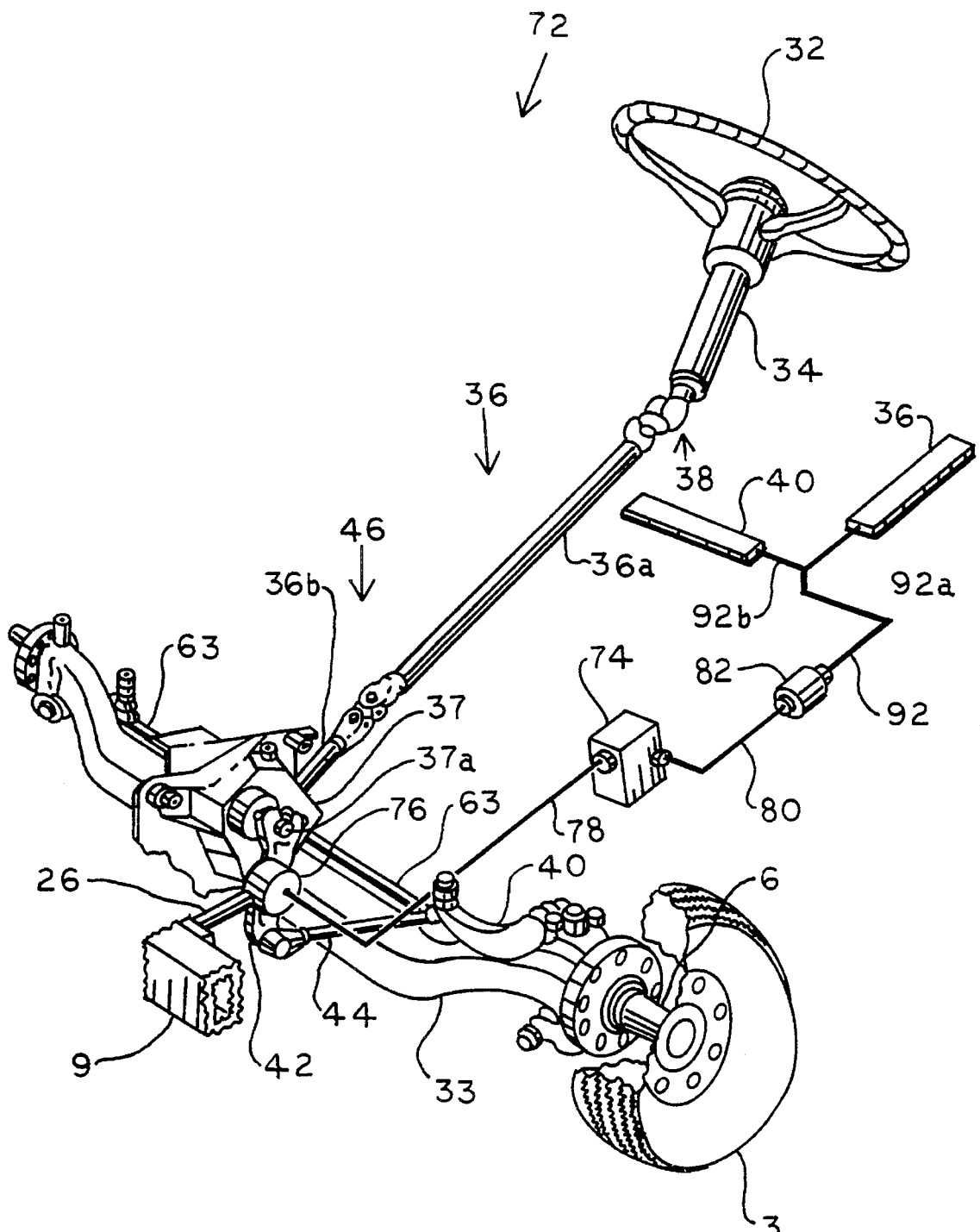
FIG. 2 is a schematic representation of a steering system for the extended motor vehicle shown in FIG. 1, made in accordance with the principles of the present invention.

Reference is now made to FIG. 2, in which is shown a steering system for the extended motor vehicle 12 shown in FIG. 1, made in accordance with the principles of the present invention, and generally designated by the numeral 72.

The steering system 72 comprises a steering wheel 32, a steering column 34, a steering shaft 36 comprising first and second segments 36a, 36b, a first univeral joint (U-joint) connecting the steering column 34 to the first segment 36a of the steering shaft 36, a second U-joint 46 connecting the first and second segments 36a, 36b of the steering shaft 36 to one another, and a gear box 37 connecting the second segment 36b of the steering shaft 36 to a pitman arm 42.

Figure 3:
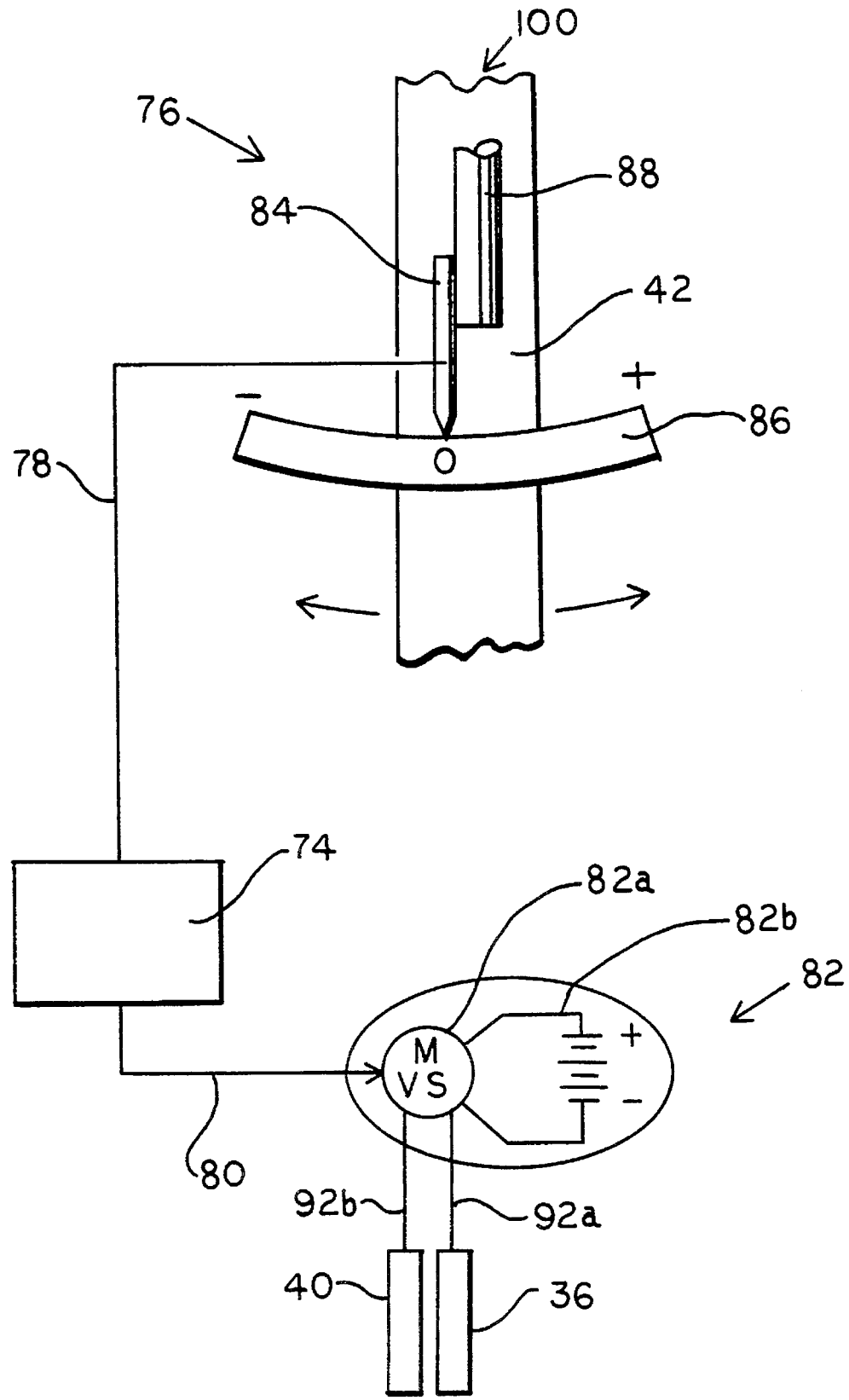
FIG. 3 is a schematic representation of the detailed structure of some of the elements of the steering system shown in FIG. 2.

Attached to the pitman arm 42 is an electrical sensor 76. The sensor 76 is fastened to the frame 11 of the extended motor vehicle 12 (FIG. 1). The sensor 76 senses the orientation of the steering wheel 32 by sensing the position of the pitman arm 42. How this is done will be better understood by reference to FIG. 3, in which is shown the detailed structure of some of the elements in the steering system 72, which detailed representation is generally designated by the numeral 100.

The assemblage 100 comprises the electrical sensor 76, which includes a shaft 88 fastened to the pitman arm 42. A pointer 84 attached to the shaft 88 makes electrical contact with a source 86 of varying electrical potential. The potential sensed by the pointer 84 depends upon the orientation and position of the pitman arm 42, which in turn depends upon the orientation of the steering wheel 32. The electrical potential of the source 86 need not, but preferably does vary from a maximum positive value at one end of the source 86 range to a maximum negative value at the other end of the range, with the middle of the range having substantially zero potential. The pointer 84 tapers to a point at the end of the pointer which contacts the source of electrical potential 86, in order the better and more accurately to read the electrical potential and thereby sense and define the position and orientation of the steering wheel 32. The source 86 of varying electrical potential need not be but preferably is of a substantially semicircular design.

As the steering wheel 32 is turned from a "straight forward" position to make a turn, the pitman arm 42, shaft 88, and pointer 84 move to the right or to the left, thereby contacting a more positive or a more negative potential. The potential sensed is transmitted via a first wire 78 to a microprocessor 74, which is programmed to receive a first signal indicative of the position of the pitman arm 42 as sensed by the sensor 76, and to transmit a second signal by a second wire 80 to a servomechanism 82 which controls the steering shaft 36 or the steering arm 40. Connection with the steering shaft 36 is via a connecting member 92a. Connection with the steering arm 40 is by a connecting member 92b.

The servomechanism 82 includes an electric motor 82a. The electric motor 82a is preferably a variable-speed, reversible motor. Power for operating the motor 82a may be provided, for example, by an electrical generator (not shown) which is part of the equipment carried on or by the vehicle 12.

The motor 82a is responsive to the signal received from the microprocessor 74. More specifically, the signal transmitted by the microprocessor 74 to the servomechanism 44 controls the speed and direction of rotation of the rotor (not shown) in the motor 82a. The motor 82a controls the steering shaft 36 or the steering arm 40, which causes the wheels 3 to turn in accordance with the orientation and position of the steering wheel 32 as sensed by the sensor 76, and with the particular geometry of the vehicle 12.

Upon receiving the signal from the sensor 76, the microprocessor 74 sends a second signal to the servomechanism 82. The second signal is likewise indicative of the orientation and position of the steering wheel 32, and includes information as to the geometry of the vehicle 12.

Either signal or both signals may be transmitted electrically or by radio. Electrical transmission comprises the use of an electrical conductor. If either signal is, or if both signals are transmitted by radio waves, the transmission system includes, for each signal, a modulator, a transmitter, a demodulator, and a receiver (not shown). The direction of displacement of the radio wave from the null plane indicates the position of the steering wheel 32, and the amplitude of the wave indicates the speed of the vehicle 12.

I claim:

1. An extended motor vehicle having front and rear ends, the vehicle comprising:

(a) an elongated, integral chassis including a frame;
   (b) a body including a motor, mounted on the frame;
   (c) a first pair of steerable wheels rotatably mounted on spindles attached to opposite ends of a first fixed axle at the front end of the vehicle;
   (d) a second pair of steerable wheels rotatably mounted on spindles attached to opposite ends of a second fixed axle at the rear end of the vehicle;
   (e) a pair of fixed wheels rotatably mounted on opposite ends of a third fixed axle disposed between and spaced apart from the first and second axles, at least one of the second and third axles being a driving axle;
   (f) a steering wheel for directing the motion of the motor vehicle; and
   (g) means for forcibly steering the second pair of steerable wheels in accordance with the orientation of the steering wheel and the geometry of the motor vehicle, said geometry being inclusive of the disposition and spacing of the axles and of the dimensions of the motor vehicle, said means for forcibly steering the second pair of steerable wheels including
      ($g_1$) a steering column connected to the steering wheel;
      ($g_2$) a steering shaft having first and second ends;
      ($g_3$) a universal joint connecting the steering column to the first end of the steering shaft;
      ($g_4$) a steering-gear box connected to the second end of the steering shaft;
      ($g_5$) a pitman arm connected to and responsive to the gear box;
      ($g_6$) an electrical sensor responsive to the position of the pitman arm and rigidly fastened to the frame of the vehicle;
      ($g_7$) a microprocessor electrically connected to the pitman arm, the microprocessor being programmed to receive from the sensor an electrical signal that is indicative of the position of the pitman arm, and to transmit an electrical signal indicative of the position of the pitman arm; and
      ($g_8$) a servomechanism constructed and arranged to receive the electrical signal from the microprocessor, and to forcibly steer the second pair of steerable wheels in accordance with said signal.

2. The motor vehicle of claim 1, wherein the electrical sensor comprises a pointer fastened to the pitman arm, the pointer making electrical contact with a source of varying electrical potential in response to the position of the pitman arm, and being electrically connected to the microprocessor.

3. The motor vehicle of claim 1, wherein the servomechanism is an electric motor.

4. The motor vehicle of claim 1, wherein the distance between the second and third axles is substantially less than the distance between the first and second axles.

5. In an extended motor vehicle having front and rear ends; a steering wheel for directing the motion of the motor vehicle; a steering column connected to the steering wheel; an elongated, integral chassis including a frame; a body including a motor, mounted on the frame; and a first pair of steerable wheels attached to opposite ends of a first fixed axle at the front end of the vehicle, the improvement comprising:

(a) a second pair of steerable wheels rotatably mounted on spindles attached to opposite ends of a second fixed axle at the rear end of the vehicle;
   (b) a pair of fixed wheels rotatably mounted on opposite ends of a third fixed axle disposed between and spaced apart from the first and second axles, at least one of the second and third axles being a driving axle;
   (c) means for forcibly steering the second pair of steerable wheels in accordance with the orientation of the steering wheel and the geometry of the motor vehicle, said geometry being inclusive of the disposition and spacing of the axles and of the dimensions of the motor vehicle, said means for forcibly steering the second pair of steerable wheels including
      ($c_1$) a steering shaft having first and second ends;
      ($c_2$) a universal joint connecting the steering column to the first end of the steering shaft;
      ($c_3$) a steering-gear box connected to the second end of the steering shaft;
      ($c_4$) a pitman arm connected to and responsive to the gear box;
      ($c_5$) an electrical sensor responsive to the position of the pitman arm and rigidly fastened to the frame of the vehicle;
      ($c_6$) a microprocessor electrically connected to the pitman arm, the microprocessor being programmed to receive from the sensor an electrical signal that is indicative of the position of the pitman arm, and to transmit an electrical signal indicative of the position of the pitman arm; and
      ($c_7$) a servomechanism constructed and arranged to receive the electrical signal from the microprocessor, and to forcibly steer the second pair of steerable wheels in accordance with said signal.

6. The motor vehicle of claim 5, wherein the electrical sensor comprises a pointer fastened to the pitman arm, the pointer making electrical contact with a source of varying electrical potential in response to the position of the pitman arm, and being electrically connected to the microprocessor.

7. The motor vehicle of claim 5, wherein the servomechanism is an electric motor.

8. The motor vehicle of claim 5, wherein the distance between the second and third axles is substantially less than the distance between the first and second axles.

* * * * *